(12) United States Patent
Brown

(10) Patent No.: US 7,077,714 B2
(45) Date of Patent: Jul. 18, 2006

(54) APPARATUS TO CONVERT AN ALL TERRAIN VEHICLE INTO A BOAT, AND METHODS OF CONSTRUCTING AND UTILIZING SAME

(76) Inventor: Robert C. Brown, 11480 Wilkes Rd., Yale, MI (US) 48097

( * ) Notice: Subject to any disclaimer, the term of this patent is extended or adjusted under 35 U.S.C. 154(b) by 201 days.

(21) Appl. No.: 10/883,504

(22) Filed: Jul. 1, 2004

(65) Prior Publication Data

US 2006/0121802 A1    Jun. 8, 2006

(51) Int. Cl.
*B60F 3/00* (2006.01)
(52) U.S. Cl. ............ 440/12.5; 440/12.51; 114/123
(58) Field of Classification Search ............ 114/123; 440/12.5, 11, 12.51
See application file for complete search history.

(56) References Cited

U.S. PATENT DOCUMENTS

| 4,664,051 | A | * | 5/1987 | Newkirk | 114/123 |
| 4,807,551 | A | * | 2/1989 | Ace | 114/123 |
| 5,400,734 | A | * | 3/1995 | Doyon | 440/12.51 |
| 6,062,156 | A | * | 5/2000 | Radke et al. | 114/144 R |
| 6,378,748 | B1 | * | 4/2002 | Cox | 224/511 |
| 6,595,812 | B1 | * | 7/2003 | Haney | 440/11 |

* cited by examiner

*Primary Examiner*—Stephen Avila
(74) *Attorney, Agent, or Firm*—Weiner & Burt, P.C.; Irving M. Weiner; Pamela S. Burt

(57) ABSTRACT

Apparatus to convert an all terrain vehicle into an amphibious off-road vehicle. A buoyant unitary structure is fitted to the all terrain vehicle with releasable fasteners. The buoyant unitary structure includes one or more internal air pockets, and a hollow compartment to accommodate the legs and feet of a user of the amphibious vehicle.

14 Claims, 1 Drawing Sheet

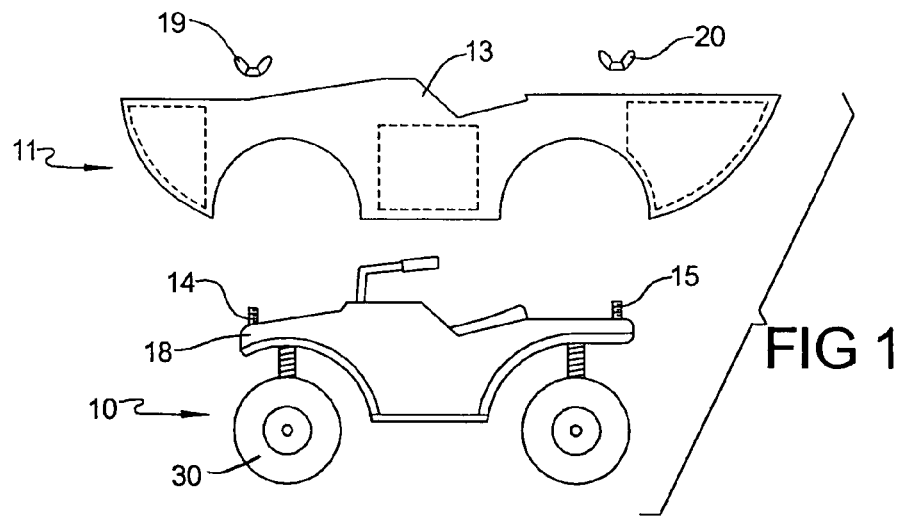
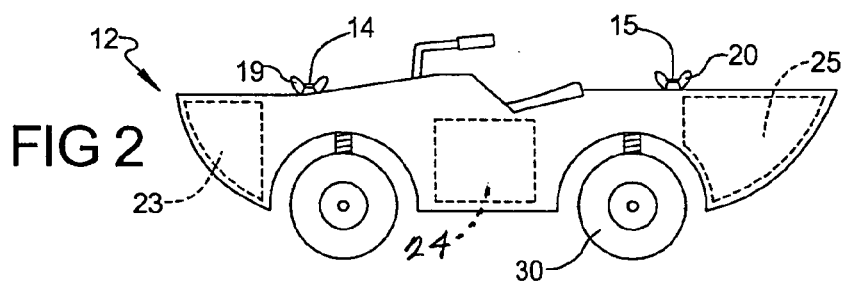
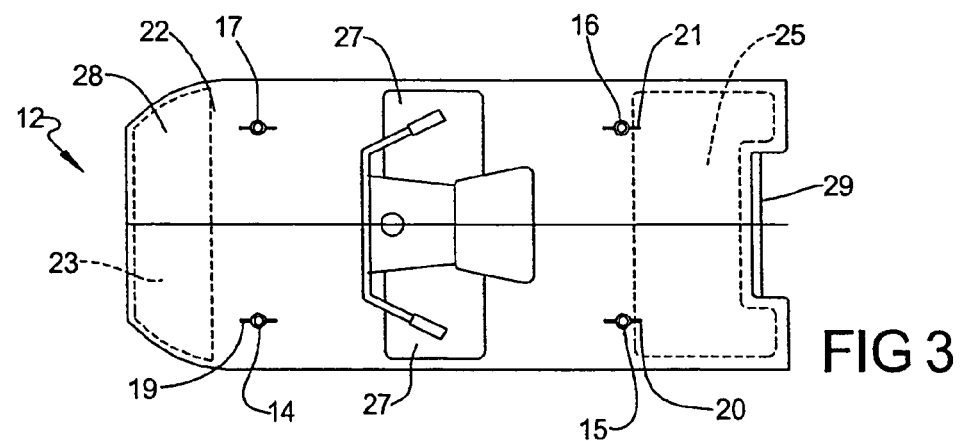

APPARATUS TO CONVERT AN ALL TERRAIN VEHICLE INTO A BOAT, AND METHODS OF CONSTRUCTING AND UTILIZING SAME

The present invention relates generally to an apparatus to convert an all terrain vehicle into an amphibious off-road vehicle, and methods of constructing and utilizing same.

More particularly, the present invention relates to an apparatus to convert an all terrain vehicle into an amphibious off-road vehicle by means of a one-piece shell, and methods of constructing and utilizing same.

BACKGROUND OF THE INVENTION

Presently, there exists no apparatus for converting a four-wheel all terrain vehicle into an amphibious off-road vehicle in less than five minutes.

The prior, but not necessarily relevant, art is exemplified by the following United States Patents.

Newkirk U.S. Pat. No. 4,664,051, entitled "THREE WHEELER FLOTATION CONVERSION KIT" discloses a conversion kit adapted to be retro-fitted to conventional three wheeled vehicles for floating them over water, wherein the flotation kit includes a front frame assembly having a pair of rigid, elongated front frame members semi-permanently coupled to the front fork of the three wheeler in axial alignment with one another.

Martinmaas U.S. Pat. No. 4,744,324, entitled "AMPHIBIOUS ALL TERRAIN VEHICLE (ATV) AND CONVERSION KIT" discloses a self-propelled all terrain vehicle which can be converted to amphibious operation by means of an amphibious conversion kit that provides rear axle extensions to mount outer rear wheels that dualize the rear wheels, and radial paddle elements on the extensions between the dual rear wheels.

Kadela U.S. Pat. No. 4,981,188, entitled "ALL TERRAIN OFF ROAD VEHICLES" discloses an all weather, all terrain, amphibious tracked vehicle for one or a small number of persons, wherein the vehicle includes a main frame structure made of strong but lightweight plastic or metal and having the general shape of an elongated enclosed box.

None of the conventional devices and techniques disclose or contemplate a novel and unique molded high impact polyethylene body with buoyant air pockets built in the front, back and sides formed to fit over an existing all terrain vehicle and which attaches thereto in less than five minutes as does the present invention.

Indeed, a desideratum of the present invention is to avoid the animadversions of the existing devices and techniques.

SUMMARY OF THE INVENTION

The present invention provides an apparatus to convert an all terrain vehicle into an amphibious off-road vehicle, comprising, in combination: an all terrain vehicle; a buoyant unitary structure for fitting over and onto said all terrain vehicle; fastening means for releasably securing said buoyant unitary structure to said all terrain vehicle; said buoyant unitary structure including at least one hollow compartment to accommodate legs and feet of a user of said apparatus and to serve as air pockets for flotation and lateral stability; and said buoyant unitary structure including one or more air pockets therein.

It is a primary objective of the present invention to provide a novel and unique apparatus, as described hereinabove, to convert an all terrain vehicle into an amphibious off-road vehicle suitable for lakes and rivers.

Another object of the present invention is to provide such a novel and unique apparatus, as described hereinabove, which includes a molded high impact polyethylene body with buoyant air pockets built in the front, back and side portions thereof.

Yet a further object of the present invention is to provide such a novel and unique apparatus, as described hereinabove, which fits over an existing all terrain vehicle and attaches with four bolts enabling any all terrain vehicle to be converted to a small boat in less than five minutes using its existing wheels for propulsion and steering.

Another object of the present invention is to provide such a novel and unique apparatus, as described hereinabove, which comprises a sleek, lightweight, one-piece shell with storage area in back and an optional motor mount for upstream travel in streams with heavier currents.

Yet a further object of the present invention is to provide such a novel and unique apparatus, described hereinabove, which includes optional storage racks at the front and rear portions thereof.

Yet a further object of the present invention is to provide such a novel and unique apparatus, described hereinabove, which includes a hollow compartment to accommodate the legs and feet of the user of the vehicle.

Another object of the present invention is to provide such a novel and unique apparatus, described hereinabove, which includes a recessed motor mount in the rear portion thereof for an optional outboard engine.

Further objects, advantages, and features of the present invention will become more apparent to those persons skilled in this particular area of technology and to other persons after having been exposed to the detailed description as forth hereinbelow in conjunction with the accompanying patent drawings.

BRIEF DESCRIPTION OF THE DRAWINGS

FIG. 1 illustrates a side elevational view of the major components in accordance with a preferred embodiment of the present invention just prior to conversion of an all terrain vehicle into an amphibious off-road vehicle.

FIG. 2 shows a side elevational view of the FIG. 1 components after conversion to an amphibious off-road vehicle.

FIG. 3 illustrates a top plan view of the assembled components as depicted in FIG. 2.

DETAILED DESCRIPTION OF SOME PREFERRED EMBODIMENTS OF THE PRESENT INVENTION

With reference to FIG. 1, there is shown an all terrain vehicle 10 and an apparatus 11 for converting the all terrain vehicle 10 into an amphibious off-road vehicle 12, which is shown in FIGS. 2 and 3.

The novel and unique apparatus 11 includes a buoyant unitary structure 13 for fitting over and onto the all terrain vehicle 10, and predetermined fastening means 14–17 and 19–22 for releasably securing the buoyant unitary structure 13 to the all terrain vehicle 10.

The fastening means preferably, but not necessarily, includes four upwardly extending bolts 14, 15, 16 and 17 attached to the frame 18 of the all terrain vehicle 10, and wing nuts or knobs 19, 20, 21 and 22 for releasable and threaded engagement with said bolts 14, 15, 16 and 17, respectively.

The buoyant unitary structure 13 includes one or more internal air pockets 23 and 25 therein, and hollow compartments 27 to accommodate the legs and feet of a user of the vehicle 12 and to serve as air pockets for floatation and lateral stability.

Preferably, but not necessarily, the buoyant structure 13 may also include a side air pocket 24 on both sides of structure 13.

The buoyant unitary structure 13 includes one or more air pockets 23, 25 and 24 or buoyant means built into the front portion, the rear portion, and/or the sides (optionally) of the buoyant unitary structure 13, which are illustrated in phantom lines in FIGS. 1, 2 and 3.

Preferably, but not necessarily, the buoyant unitary structure 13 may comprise a molded high-impact polyethylene body 28 with buoyant air pockets 23, 25 and 24 built into the front, back and side portions, respectively, and wherein such body 28 is formed to fit over the existing all terrain vehicle 10.

Optionally, the buoyant unitary structure 13 preferably, but not necessarily, may include in the rear portion thereof a recessed motor mount 29 for accommodating an optional outboard engine (not shown).

The optional recessed motor mount 29 to accommodate an outboard engine may be used for upstream travel in streams with a heavier current.

It is important to understand that with the components 14–17 and 19–22 and structure 13 described hereinabove, the user is able to convert the all terrain vehicle 10 to become a small boat 12 which utilizes the existing wheels 30 of the all terrain vehicle 10 for propulsion and steering.

Various modifications can be made in the structure and components described hereinabove.

Therefore, while there has been set forth above only some preferred embodiments of the present invention, it should be understood that the present invention is not to be limited or restricted in the particular embodiments described in detail hereinabove which have been set forth for illustrative purposes only.

The scope of the present invention is set forth in the claims which follow hereinbelow.

The invention claimed is:

1. An apparatus to convert an all terrain vehicle into an amphibious off-road vehicle, comprising, in combination:
   an all terrain vehicle;
   a buoyant unitary structure for fitting over and onto said all terrain vehicle;
   fastening means for releasably securing said buoyant unitary structure to said all terrain vehicle;
   said buoyant unitary structure including at least one hollow compartment to accommodate legs and feet of a user of said apparatus and to serve as air pockets for flotation and lateral stability;
   said buoyant unitary structure including one or more air pockets therein;
   said buoyant unitary structure includes at least one air pocket built into a front portion of said buoyant unitary structure; and
   said buoyant unitary structure includes at least one air pocket built into a rear portion of said buoyant unitary structure, and at least one air pocket built into either side of said buoyant unitary structure.

2. The apparatus according to claim 1, wherein:
   said fastening means includes a plurality of bolts attached to said all terrain vehicle, and a plurality of wing nuts or knobs for threadably attaching to said bolts.

3. The apparatus according to claim 1, wherein:
   said buoyant unitary structure includes in a rear portion thereof a recessed motor mount for accommodating an optional outboard engine.

4. The apparatus according to claim 2, wherein:
   said buoyant unitary structure includes in a rear portion thereof a recessed motor mount for accommodating an optional outboard engine.

5. The apparatus according to claim 2, wherein:
   said buoyant unitary structure comprises a molded high-impact polyethylene body with buoyant air pockets built, in front, rear and side portions thereof and formed to fit over said all terrain vehicle to make the resulting combination a small boat using the existing wheels of said all terrain vehicle for propulsion and steering.

6. The apparatus according to claim 4, wherein:
   said buoyant unitary structure comprises a molded high-impact polyethylene body with buoyant air pockets built in front, rear and side portions thereof and formed to fit over said all terrain vehicle to make the resulting combination a small boat using the existing wheels of said all terrain vehicle for propulsion and steering.

7. An apparatus to convert an all terrain vehicle into an amphibious off-road vehicle, comprising, in combination:
   an all terrain vehicle;
   a buoyant unitary structure for fitting over and onto said all terrain vehicle;
   fastening means for releasably securing said buoyant unitary structure to said all terrain vehicle;
   said buoyant unitary structure including at least one hollow compartment to accommodate legs and feet of a user of said apparatus and to serve as air pockets for flotation and lateral stability;
   said buoyant unitary structure including one or more air pockets therein; and
   said buoyant unitary structure includes in a rear portion thereof a recessed motor mount for accommodating an optional outboard engine.

8. The apparatus according to claim 7, wherein:
   said buoyant unitary structure includes at least one air pocket built into a front portion of said buoyant unitary structure.

9. The apparatus according to claim 7, wherein:
   said buoyant unitary structure includes at least one air pocket built into a rear portion of said buoyant unitary structure, and at least one air pocket built into either side of said buoyant unitary structure.

10. The apparatus according to claim 7, wherein:
    said fastening means includes a plurality of bolts attached to said all terrain vehicle, and a plurality of wing nuts or knobs for threadably attaching to said bolts.

11. The apparatus according to claim 10, wherein:
    said buoyant unitary structure includes at least one air pocket built into a front portion of said buoyant unitary structure.

12. The apparatus according to claim 10, wherein:
    said buoyant unitary structure includes at least one air pocket built into a rear portion of said buoyant unitary structure, and at least one air pocket built into either side of said buoyant unitary structure.

13. An apparatus to convert an all terrain vehicle into an amphibious off-road vehicle, comprising, in combination:

an all terrain vehicle;

a buoyant unitary structure for fitting over and onto said all terrain vehicle;

fastening means for releasably securing said buoyant unitary structure to said all terrain vehicle;

said buoyant unitary structure including at least one hollow compartment to accommodate legs and feet of a user of said apparatus and to serve as air pockets for flotation and lateral stability;

said buoyant unitary structure including one or more air pockets therein; and said buoyant unitary structure comprises a molded high-impact polyethylene body with buoyant air pockets built in front, rear and side portions thereof and formed to fit over said all terrain vehicle to make the resulting combination a small boat using the existing wheels of said all terrain vehicle for propulsion and steering.

14. The apparatus according to claim 13, wherein:

said fastening means includes a plurality of bolts attached to said all terrain vehicle, and a plurality of wing nuts or knobs for threadably attaching to said bolts.

* * * * *